US011326981B2

(12) United States Patent
Furukawa

(10) Patent No.: US 11,326,981 B2
(45) Date of Patent: May 10, 2022

(54) OPTICAL FIBER CHARACTERISTICS MEASURING APPARATUS AND OPTICAL FIBER CHARACTERISTICS MEASURING METHOD

(71) Applicant: YOKOGAWA ELECTRIC CORPORATION, Tokyo (JP)

(72) Inventor: Osamu Furukawa, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/233,836

(22) Filed: Dec. 27, 2018

(65) Prior Publication Data

US 2019/0195731 A1 Jun. 27, 2019

(30) Foreign Application Priority Data

Dec. 27, 2017 (JP) .............................. JP2017-252458

(51) Int. Cl.
*G01M 11/00* (2006.01)
*G01M 11/08* (2006.01)
(Continued)

(52) U.S. Cl.
CPC ......... *G01M 11/3172* (2013.01); *G01L 1/242* (2013.01); *G01M 5/0091* (2013.01); *G01M 11/083* (2013.01); *G01M 11/319* (2013.01)

(58) Field of Classification Search
CPC . G01L 1/242; G01M 11/083; G01M 11/3172; G01M 11/319; G01M 5/0091; G02F 1/353; H01S 3/0057
See application file for complete search history.

(56) References Cited

U.S. PATENT DOCUMENTS

| 4,721,385 A * | 1/1988 | Jelalian .................. G01S 17/42 356/28.5 |
| 10,018,501 B2 * | 7/2018 | Furukawa .......... G01D 5/35306 |

(Continued)

FOREIGN PATENT DOCUMENTS

| CN | 101201292 A | 6/2008 |
| CN | 102645268 A | 8/2012 |

(Continued)

OTHER PUBLICATIONS

Yosuke Mizuno, Zuyuan He, and Kazuo Hotate, "Measurement range enlargement in Brillouin optical correlation-domain reflectometry based on temporal gating scheme," Opt. Express 17, 9040-9046 (2009) (Year: 2009).*

(Continued)

*Primary Examiner* — Violeta A Prieto
(74) *Attorney, Agent, or Firm* — Osha Bergman Watanabe & Burton LLP

(57) ABSTRACT

An optical fiber characteristics measuring apparatus includes: a light source that outputs frequency-modulated continuous wave of light; a first optical branching unit that branches the continuous light into pump light and reference light; a second optical branching unit that outputs backscattered light generated by making the pump light incident from one end of an optical fiber to be measured, wherein the backscattered light is Brillouin scattering in the optical fiber; a detector that detects interference light of the backscattered light and the reference light; a measuring unit that measures characteristics of the optical fiber by using a detection signal output from the detector; and a controller that controls the light source to change modulation frequency of the continuous light in units of one period or half a period of a modulation period corresponding to the modulation frequency.

15 Claims, 8 Drawing Sheets

(51) Int. Cl.
*G01M 5/00* (2006.01)
*G01L 1/24* (2006.01)

(56) References Cited

U.S. PATENT DOCUMENTS

| | | | |
|---|---|---|---|
| 2008/0145049 | A1 | 6/2008 | Koyamada |
| 2011/0032517 | A1* | 2/2011 | Hotate .................. G01M 11/332 356/73.1 |
| 2011/0102776 | A1* | 5/2011 | Hasegawa .......... G01M 11/3136 356/124.5 |
| 2012/0237205 | A1 | 9/2012 | Duncan et al. |
| 2013/0308123 | A1* | 11/2013 | Kishi ..................... G01M 11/33 356/73.1 |
| 2017/0067794 | A1 | 3/2017 | Matsuura et al. |
| 2017/0254697 | A1* | 9/2017 | Furukawa .......... G01D 5/35306 |
| 2020/0124497 | A1* | 4/2020 | Furukawa ............ G01M 11/319 |

FOREIGN PATENT DOCUMENTS

| | | |
|---|---|---|
| CN | 106500970 A | 3/2017 |
| JP | 2009-139241 A | 6/2009 |
| JP | 5105302 B2 | 12/2012 |

OTHER PUBLICATIONS

Yosuke Mizuno et al., "Measurement range enlargement in Brillouin optical correlation-domain reflectometry based on temporal gating scheme" Optics Express Vo. 17, No. 11, pp. 9040-9046 (7 pages).

Extended European Search Report issued in corresponding European application No. EP18306853.5 dated Jun. 4, 2019 (10 pages).

Luca Schenato et al., "A Review of Distributed Fibre Optic Sensors for Geo-Hydrological Applications"; Applied Science vol. 7, No. 9; Sep. 1, 2017 (42 pages).

* cited by examiner

| LF[m] | $t_{LF}[\mu s]$ |
|---|---|
| 0 | 2.5 |
| 500 | 7.5 |
| 1000 | 12.5 |

OPTICAL FIBER CHARACTERISTICS MEASURING APPARATUS AND OPTICAL FIBER CHARACTERISTICS MEASURING METHOD

CROSS-REFERENCE TO RELATED APPLICATION

The present application claims priority from Japanese Patent Application No. 2017-252458 filed on Dec. 27, 2017, the entire content of which is incorporated herein by reference.

TECHNICAL FIELD

The present invention relates to an optical fiber characteristics measuring apparatus and an optical fiber characteristics measuring method for measuring characteristics of an optical fiber based on backscattered light generated by Brillouin scattering in the optical fiber which is an object to be measured.

BACKGROUND

An optical fiber is one of optical transmission media, Brillouin scattering generated by making light incident on the optical fiber varies depending on strain applied to the optical fiber and temperature of the optical fiber. There is known a method for measuring a distributed strain and a distributed temperature in a longitudinal direction of the optical fiber by measuring a frequency shift of the Brillouin scattered light. For example, by deploying the optical fiber over a structure such as a bridge, a building or the like and specifying a strained part of the optical fiber based on the above method, it is possible to detect strain generated in the structures. As such a measuring method, a so-called BOTDR (Brillouin Optical Time Domain Reflectometry) method, a BOCDR (Brillouin Optical Correlation Domain Reflectometry) method or the like are known.

The BOTDR method detects backscattered light (Brillouin scattered light) of Brillouin scattering obtained by making an optical pulse incident from one end of an optical fiber to be measured (a fiber under test), and measures both of a frequency shift of the Brillouin scattered light (hereinafter referred to as Brillouin frequency shift) with respect to incident light and time until the Brillouin scattered light returns back. This Brillouin scattered light is subject to the Doppler effect by an acoustic wave whose speed varies depending on strain and temperature of the optical fiber to be measured, and therefore, is shifted to a frequency that is different from the incident light. The magnitude of the strain and temperature of the optical fiber to be measured can be measured by measuring the above Brillouin frequency shift, and further, a position in the longitudinal direction of the optical fiber to be measured can be specified by measuring the time until the Brillouin scattered light returns back.

The BOCDR measuring method detects Brillouin scattered light obtained by making pump light, which is frequency-modulated continuous wave of light, incident from one end of the optical fiber to be measured, and measures a Brillouin frequency shift. As described in the following Patent Document 1 and Non-Patent Document 1, in the BOCDR measuring method, by interfering the Brillouin scattered light with reference light, Brillouin scattered light at a specific position where "correlation peak" appears in the optical fiber to be measured is selectively extracted. For example, in a case where continuous wave of light (which is referred to as continuous light) given a sinusoidal frequency modulation is made incident on the optical fiber to be measured, an interval between correlation peaks in the optical fiber to be measured is inversely proportional to modulation frequency of the sinusoidal frequency modulation. Further, by sweeping the modulation frequency of the continuous light, the correlation peak along the longitudinal direction of the optical fiber to be measured can be moved. By obtaining the Brillouin frequency shift at each correlation peak point while moving the correlation peak, it is possible to measure the distributed strain and the distributed temperature in the longitudinal direction of the optical fiber to be measured.

The BOCDR measuring method described above can selectively output Brillouin scattered light in a narrow region of about several centimeters in the optical fiber to be measured as an interference output corresponding to the specific position in the longitudinal direction of the optical fiber to be measured. In addition, since the continuous light rather than an optical pulse is made incident on the optical fiber to be measured, signal intensity of the backscattered light generated in the optical fiber to be measured is high, and since it does not require a large number of averaging, a measurement time can be shortened. The spatial resolution and measurement time in the BOCDR measuring method are superior to the spatial resolution (usually 1 m or more) and measurement time (several minutes to several tens of minutes) in the BOTDR measuring method in which an optical pulse is made incident on the optical fiber to be measured.

Here, in the BOCDR measuring method described above, in a case where the length of the optical fiber to be measured is longer than the interval between the correlation peaks described above, a plurality of correlation peaks appears in the optical fiber to be measured. In such a case, it is necessary to avoid crosstalk in such a way that one of correlation peaks is selected, and only Brillouin scattered light at the position where the selected correlation peak appears is extracted while Brillouin scattered light at a position where other correlation peaks appear is not extracted. As a method for selecting a correlation peak in such a way, there is a method called a temporal gating scheme. In the temporal gating scheme, the continuous light given a sinusoidal frequency modulation is shaped into a pulse shape and then made incident on the optical fiber to be measured, and a light reception timing of the Brillouin scattered light is adjusted, so as to select a correlation peak of the optical fiber to be measured. For details of the temporal gating scheme, for example, see the following Non-Patent Document 1.

PRIOR ART DOCUMENT

Patent Document

Patent Document 1: JP-B-5105302

Non-Patent Document

Non-Patent Document 1: Yosuke Mizuno et al., "Measurement range enlargement in Brillouin optical correlation-domain reflectometry based on temporal gating scheme", Optics Express Vo. 17, No. 11, p. 9040-9046

As described above, in the related-art temporal gating scheme, the continuous light given a sinusoidal frequency modulation is shaped into a pulse shape (hereinafter, referred to as modulated pulse light) and then made incident on the optical fiber to be measured, and a light reception timing of the Brillouin scattered light is adjusted, so as to select a correlation peak of the optical fiber to be measured. Therefore, in the related-art temporal gating scheme, after the modulated pulse light is incident from one end of the optical fiber to be measured, the next modulated pulse light cannot be incident to the optical fiber to be measured until the Brillouin scattered light (Brillouin scattered light on the other end of the optical fiber to be measured), which is obtained by the modulated pulse light arriving at the other end of the optical fiber to be measured, returns back to the one end of the optical fiber to be measured.

FIG. 9 is a diagram for explaining a related-art temporal gating scheme. In FIG. 9, the horizontal axis represents time and the vertical axis represents a distance from the one end of the optical fiber to be measured. Here, it is assumed that a correlation peak appears at positions where the distances from one end (position where the distance is 0) of the optical fiber to be measured are d100 and d200. FIG. 9 shows modulated pulse light P100, P200 incident on the optical fiber to be measured, Brillouin scattered light LS100 emitted from one end of the optical fiber to be measured, and the reference light LR100.

The modulated pulse light P100 is the first pulse light incident on the optical fiber to be measured at time t100, and the modulated pulse light P200 is the second pulse light incident on the optical fiber to be measured at time t200. For convenience of illustration, light intensity of the modulated pulse light P100, P200 and Brillouin scattered light LS100 is taken as shown in a right direction of the page. In FIG. 9, for convenience of understanding, the modulated pulse light P100, P200, the Brillouin scattered light LS100, and the reference light LR100 are shown together with a modulation signal m100 which is used for sinusoidal frequency modulation. The same modulation signal m100 (modulation frequency fm, modulation amplitude Δfm) is used for modulation of the modulated pulse light P100, P200 and the reference light LR100. A pulse width of the modulated pulse light P100, P200 is set to one period or half a period of a modulation period of the modulation signal m100. FIG. 9 shows an example in which the pulse width is set to half a period of the modulation period of the modulation signal m100.

As shown in FIG. 9, the Brillouin scattering light at a position where the distance from the one end of the optical fiber to be measured is d200 is obtained by the modulated pulse light P100 being incident on the optical fiber to be measured. Further, the Brillouin scattering light at a position where the distance from the one end of the optical fiber to be measured is d100 is obtained by the modulated pulse light P200 being incident on the optical fiber to be measured. In the example shown in FIG. 9, the two kinds of obtained Brillouin scattered light are emitted from the one end of the optical fiber to be measured at exactly the same timing (time t300) and interfere with the reference light LR100. At this time, strain (or temperature) at a position where the distance from the one end of the optical fiber to be measured is d100 and strain (or temperature) at a position where the distance from the one end of the optical fiber to be measured is d200 cannot be measured individually.

As described above, in the related-art temporal gating scheme, after the modulated pulse light (for example, the modulated pulse light P100) is incident from the one end of the optical fiber to be measured, if the next modulated pulse light (for example, the modulated pulse light P200) is incident to the optical fiber to be measured before the Brillouin scattered light (for example, Brillouin scattered light LS100 at the distance d200) on the other end of the optical fiber to be measured returns back to the one end of the optical fiber to be measured, characteristics of the optical fiber to be measured may not able to be measured in some cases. For this reason, in the related-art temporal gating scheme, the next modulated pulse light must be incident on the optical fiber to be measured after the Brillouin scattered light on the other end of the optical fiber to be measured returns back to the one end of the optical fiber to be measured. Accordingly, in the BOCDR measuring method using the related-art temporal gating scheme, the time required for the measurement becomes longer as the length of the optical fiber to be measured becomes longer.

SUMMARY

One or more embodiments of the present invention provide an optical fiber characteristics measuring apparatus and an optical fiber characteristics measuring method in which the characteristics of the optical fiber to be measured can be measured by making the pump light incident on the optical fiber to be measured without waiting for the return of the Brillouin scattered light which is obtained by making the pump light incident on the optical fiber to be measured, so that the time required for the measurement can be reduced.

An optical fiber characteristics measuring apparatus includes a light source, a first optical branching unit, a second optical branching unit, a detection unit, a measuring unit and a control unit. The light source unit outputs frequency-modulated continuous wave of light. The first optical branching unit branches the continuous light into pump light and reference light. The second optical branching unit outputs backscattered light which is generated by making the pump light incident from one end of an optical fiber to be measured and which is subjected to Brillouin scattering in the optical fiber to be measured. The detection unit detects interference light of the backscattered light and the reference light. The measuring unit measures characteristics of the optical fiber to be measured by using a detection signal output from the detection unit. The control unit controls the light source unit to change modulation frequency of the continuous light in units of one period or half a period of a modulation period corresponding to the modulation frequency.

In the optical fiber characteristics measuring apparatus, the control unit controls the light source unit to change modulation amplitude of the continuous light together with the modulation frequency.

In the optical fiber characteristics measuring apparatus, the control unit changes the modulation frequency and the modulation amplitude such that spatial resolution in a longitudinal direction of the optical fiber to be measured is constant for each unit.

In the optical fiber characteristics measuring apparatus, the control unit changes the modulation frequency and the modulation amplitude such that spatial resolution in a longitudinal direction of the optical fiber to be measured is different from each other for each unit.

In the optical fiber characteristics measuring apparatus, the control unit changes the modulation frequency and the modulation amplitude such that the modulation frequency and a combination of the modulation frequency and the modulation amplitude are different from each other for each unit.

The optical fiber characteristics measuring apparatus further includes an optical gate unit. The optical gate unit brings an optical path between the first optical branching unit and the second optical branching unit into a disconnected state or a connected state under the control of the control unit.

In the optical fiber characteristics measuring apparatus, the control unit controls the optical gate unit to shape the pump light into pulsed light which has a pulse width of one period or half a period of the modulation period.

In the optical fiber characteristics measuring apparatus, in a case where the optical path between the first optical branching unit and the second optical branching unit is in the disconnected state, the control unit controls, in consideration of a return time of the backscattered light, the light source unit to generate the reference light which interferes with the backscattered light by changing the modulation frequency of the continuous light in units of one period or half a period of the modulation period corresponding to the modulation frequency.

In the optical fiber characteristics measuring apparatus, in a case where the second optical branching unit makes first and second pump light incident on the optical fiber to be measured, the detection unit detects the interference light of (i) the backscattered light obtained by the pulsed light modulated by the control unit, corresponding to the first pump light and (ii) the reference light generated by the light source in consideration of the return time of the backscattered light, corresponding to the first pump light. The measuring unit measures the characteristics of the optical fiber to be measured by making the second pump light incident on the optical fiber to be measured without waiting for the return of the backscattered light corresponding to the first pump light.

In the optical fiber characteristics measuring apparatus, the control unit controls a change order of the modulation frequency in a case of shaping the pump light into the pulsed light to be different from a change order of the modulation frequency in a case of obtaining the frequency-modulated continuous wave of light.

In the optical fiber characteristics measuring apparatus, the control unit controls a change order and change timing of the modulation frequency in a case of shaping the pump light into the pulsed light to be respectively the same as a change order and a change timing of the modulation frequency in a case of obtaining the frequency-modulated continuous wave of light.

An optical fiber characteristics measuring method, includes: changing modulation frequency of frequency-modulated continuous wave of light output from a light source unit in units of one period or half a period of a modulation period corresponding to the modulation frequency; detecting interference light of backscattered light and reference light, the backscattered light being generated by making modulation frequency-changed light incident on one end of an optical fiber to be measured and subjected to Brillouin scattering in the optical fiber to be measured, and frequency of the reference light being modulated in units of one period or half a period of the modulation period; and measuring characteristics of the optical fiber to be measured by using a detection result of the interference light.

The optical fiber characteristics measuring method, further includes: obtaining the frequency-modulated continuous wave of light by changing modulation frequency of the continuous light in units of one period or half a period of the modulation period corresponding to the modulation frequency in consideration of a return time of the backscattered light.

The optical fiber characteristics measuring method, further includes: shaping the modulation frequency-changed continuous light into pulsed light having a pulse width of one period or half a period of the modulation period and being incident from the one end of the optical fiber to be measured.

According to one or more embodiments of the present invention, the characteristics of the optical fiber to be measured can be measured by making the pump light incident on the optical fiber to be measured without waiting for the return of the Brillouin scattered light which is obtained by making the pump light incident on the optical fiber to be measured. Therefore, the time required for the measurement can be reduced.

DETAILED DESCRIPTION

Hereinafter, an optical fiber characteristics measuring apparatus and an optical fiber characteristics measuring method according to one or more embodiments of the present invention are described in detail with reference to the accompanying drawings.

<Configuration of Optical Fiber Characteristics Measuring Apparatus>

Figure 1:
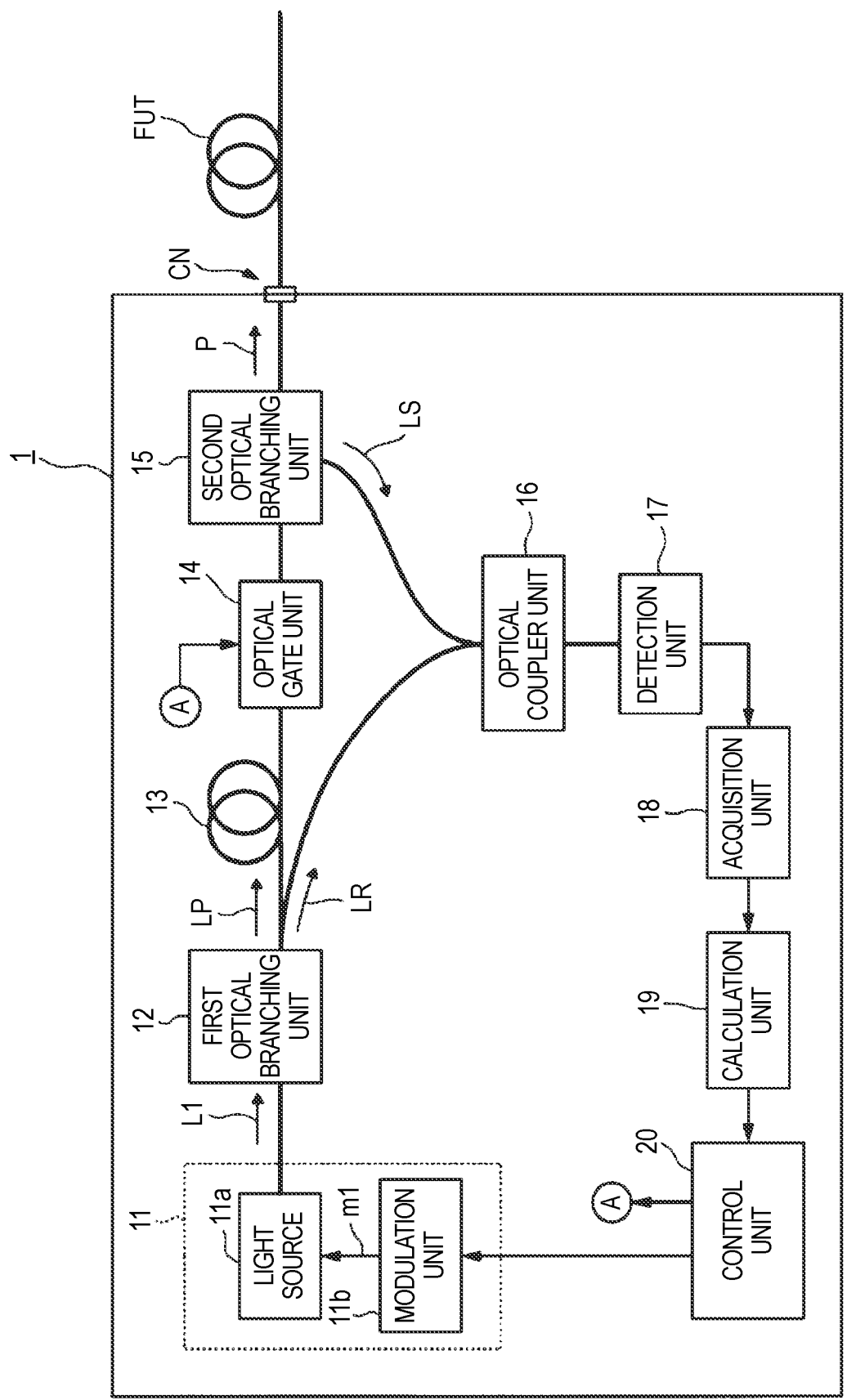
FIG. 1 is a block diagram showing a configuration of main parts of an optical fiber characteristics measuring apparatus according to one or more embodiments of the present invention.

FIG. 1 is a block diagram showing a configuration of main parts of an optical fiber characteristics measuring apparatus according to one or more embodiments of the present invention. As shown in FIG. 1, the optical fiber characteristics measuring apparatus 1 of one or more embodiments includes a light source 11, a first optical branching unit 12 ("optical splitter"), an optical delaying unit 13, an optical gate 14, a second optical branching unit 15 ("optical circulator"), an optical coupler unit 16, a detection unit (detector) 17, an acquisition unit 18 (measuring unit), a calculation unit 19 (measuring unit, "calculator"), and a control unit (controller) 20. The optical fiber characteristics measuring apparatus 1 of one or more embodiments is a so-called BOCDR measuring device that measures the characteristics of an optical fiber to be measured FUT based on backscattered light (backscattered light generated by Brillouin scattering in the optical fiber to be measured FUT) which is obtained by making modulated pulse light P (pump light LP as continuous light given a frequency modulation which is shaped into a pulse shape) incident on the optical fiber to be measured FUT. The optical fiber to be measured FUT may be any optical fiber according to a wavelength or the like of the modulated pulse light P. In addition, it is assumed that a plurality of correlation peaks exists in the optical fiber to be measured FUT in one or more embodiments.

The light source 11 includes a light source 11a and a modulation unit 11b, and outputs continuous light L1 which is frequency-modulated under the control of the control unit 20. The light source 11a includes a semiconductor laser element such as a distributed feed-back laser diode (DFB-LD), and outputs the frequency-modulated continuous wave of light L1 in accordance with a modulation signal m1 output from the modulation unit 11b. Under the control of the control unit 20, the modulation unit 11b outputs the modulation signal m1 for frequency modulating the continuous light L1 output from the light source 11a. The modulation signal m1 is, for example, a sinusoidal signal, and the frequency (modulation frequency fm) and amplitude (modulation amplitude Δfm) thereof are controlled by the control unit 20. Hereinafter, the modulation frequency fm and modulation amplitude Δfm controlled by the control unit 20 may also be referred to as "modulation parameters".

The first optical branching unit 12 branches the continuous light L1 input from the light source 11 into pump light LP and reference light LR with a predetermined intensity ratio (for example, 1:1). The optical delaying unit 13 delays the pump light LP branched by the first optical branching unit 12 by a predetermined time. The optical delaying unit 13 includes, for example, an optical fiber having a predetermined length. The delay time can be adjusted by changing the length of the optical fiber. Such the optical delaying unit 13 is provided so that a 0th order correlation peak, whose appearing position does not move even if the modulation frequency fm is swept, is disposed outside of the optical fiber to be measured FUT, and a plurality of modulated pulse light P can be made incident on the optical fiber to be measured FUT at a time.

The optical gate 14 increases or decreases the intensity of the pump light LP to bring an optical path between the first optical branching unit 12 and the second optical branching unit 15 (more precisely, an optical path between the optical delaying unit 13 and the second optical branching unit 15) into a disconnected state or a connected state. Here, the disconnected state means that the intensity of the pump light LP is decreased and the optical path between the first optical branching unit 12 and the second optical branching unit 15 is substantially disconnected, and the connected state means that the intensity of the pump light LP is increased and the optical path between the first optical branching unit 12 and the second optical branching unit 15 is substantially connected. The disconnected state and connected state of the optical gate 14 is controlled by the control unit 20. Such the optical gate 14 is provided so that the pump light LP is shaped into a pulse shape, and the modulated pulse light P used in the temporal gating scheme is obtained. In addition, the reference light LR generated separately from the modulated pulse light P is prevented to be incident on the optical fiber to be measured FUT as the modulated pulse light P.

The second optical branching unit 15 includes a first port, a second port, and a third port. The first port is connected to the optical gate 14. The second port is connected to the optical fiber to be measured FUT via an optical connector CN. The optical connector CN is a connector that connects a path extending from the second port of the second optical branching unit 15 and the optical fiber to be measured FUT. The third port is connected to the optical coupler unit 16. The second optical branching unit 15 outputs the modulated pulse light P input from the first port to the second port. In addition, the backscattered light LS from the optical fiber to be measured FUT input from the second port is output to the third port. An optical circulator, for example, can be used as the second optical branching unit 15.

The optical coupler unit 16 mixes the backscattered light LS from the optical fiber to be measured FUT output from the third port of the second optical branching unit 15 and the reference light LR output from the first optical branching unit 12 with each other. In addition, the optical coupler unit 16 branches the mixed light into two beams of light with a predetermined intensity ratio (for example, 1:1) and outputs them to the detection unit 17. Both beams of the light branched by the optical coupler unit 16 each include 50% of backscattered light from the optical fiber to be measured FUT and 50% of the reference light, for example.

The detection unit 17 performs optical heterodyne detection by interfering the backscattered light LS with the reference light LR which are included in the two beams of light output from the optical coupler unit 16. The detection unit 17 includes, for example, a balanced photo diode formed by connecting two photo diodes (PD) in series, and the two beams of light output from the optical coupler unit 16 are respectively received by these two photo diodes. An interference signal (detected as a beat signal) indicating a frequency difference between the backscattered light LS and the reference light LR is output from the detection unit 17.

The acquisition unit 18 acquires an electrical beat signal output from the detection unit 17 and measures frequency characteristic of the acquired beat signal. The acquisition unit 18 may include, for example, a spectrum analyzer or the like. Alternatively, the acquisition unit 18 may acquire temporally continuous data by a time axis measuring device such as an oscilloscope, and then separately convert the data into spectrum data using a technique such as Fast Fourier Transform or the like.

The calculation unit 19 calculates a Brillouin frequency shift from the spectrum data measured by the acquisition unit 18. The calculation unit 19 may include a display unit which displays the Brillouin frequency shift obtained by calculation as physical information such as strain, temperature or the like. Further, information such as strain, temperature or the like of the optical fiber to be measured FUT may be interpreted as information meaning a state of an object to be measured and displayed on the display unit. The display unit is, for example, a liquid crystal display, an organic Electro Luminescence (EL) display device, or the like. When the calculation is completed, the calculation unit 19 outputs, to the control unit 20, a calculation result or the fact that the calculation is ended.

The control unit 20 performs overall control of the operation of the optical fiber characteristics measuring apparatus 1 while referring to the calculation result or the like of the calculation unit 19. For example, the control unit 20 controls the light source 11 to change modulation frequency of the continuous light L1 output from the light source 11.

Specifically, the control unit 20 changes the modulation frequency of the continuous light L1 output from the light source 11 in units of one period or half a period of the modulation period corresponding to the modulation frequency. In one or more embodiments, a case where the control unit 20 changes the modulation frequency of the continuous light L1 in units of half a period of the modulation period will be described as an example. As described in detail later, such change is performed so that the characteristics of the optical fiber to be measured FUT can be measured by making the next modulated pulse light incident on the optical fiber to be measured FUT without waiting for the return of the backscattered light LS which is obtained by making the modulated pulse light P incident on the optical fiber to be measured FUT. Here, the modulated pulse light P is pulsed light whose modulation frequency is changed in units of half a period of the modulation period and half a period of the modulation period is a pulse width. The backscattered light LS, which is obtained by making such a modulated pulse light P incident on the optical fiber to be measured FUT, is pulsed light whose frequency is different in half a period of the modulation period as a unit and half a period of the modulation period is a pulse width.

In addition, the control unit 20 controls the light source 11 to change the modulation amplitude together with the modulation frequency of the continuous light L1 output from the light source 11. Such a change is performed so that spatial resolution Δz in a longitudinal direction of the optical fiber to be measured FUT is constant for each unit. Here, the spatial resolution Δz is inversely proportional to a product of the modulation amplitude and the modulation frequency of the modulation signal m1. For this reason, the control unit 20 performs control to change the modulation amplitude according to the modulation frequency after the change such that the product of the modulation amplitude and the modulation frequency after the change is equal to the product of the modulation amplitude and the modulation frequency before the change, thereby making the spatial resolution Δz constant.

Here, there is a plurality of combinations of modulation parameters (modulation frequency fm, modulation amplitude Δfm) for keeping the spatial resolution Δz constant. Therefore, a plurality of combinations of modulation parameters for keeping the spatial resolution Δz constant are prepared in advance in the control unit 20, and the control unit 20 may select one of the combinations for each unit. It is desirable that the modulation frequency of the plurality of combinations prepared in advance in the control unit 20 is different from each other. Further, when generating the modulated pulse light P, the control unit 20 may exclude a once selected modulation parameter from the option. By doing as described above, it is possible to make the modulation frequency and the combination of the modulation frequency and the modulation amplitude different from each other for each unit. The combination of the modulation parameters may be prepared in a table form, for example.

The control unit 20 controls the optical gate 14 to bring the optical path between the first optical branching unit 12 and the second optical branching unit 15 into the disconnected state or the connected state. In a case of generating the modulated pulse light P to be incident on the optical fiber to be measured FUT, the control unit 20 controls the optical gate 14 so that the optical path between the first optical branching unit 12 and the second optical branching unit 15 is brought into the disconnected state again after switching from the disconnected state to the connected state, thereby shaping the pump light LP into a pulse shape. Here, the control unit 20 controls the optical gate 14 so that the pulse width of the modulated pulse light P is one period or half a period of the modulation period corresponding to the modulation frequency. In one or more embodiments, a case where the control unit 20 controls the optical gate 14 so that the pulse width of the modulated pulse light P is half a period of the modulation period will be described as an example.

In a case of generating the reference light LR to be interfered with the backscattered light LS, the control unit 20 controls the optical gate 14 to bring the optical path between the first optical branching unit 12 and the second optical branching unit 15 into the disconnected state. Further, in consideration of a return time of the backscattered light LS, the control unit 20 controls the light source 11 to generate the reference light LR by changing the modulation frequency of the continuous light L1 in units of one period or half a period of the modulation period corresponding to the modulation frequency. In one or more embodiments, a case where the control unit 20, when generating the reference light LR, changes the modulation frequency in units of one period of the modulation period will be described as an example.

<Measurement Principle of Optical Fiber Characteristics Measuring Apparatus>

Figure 2:
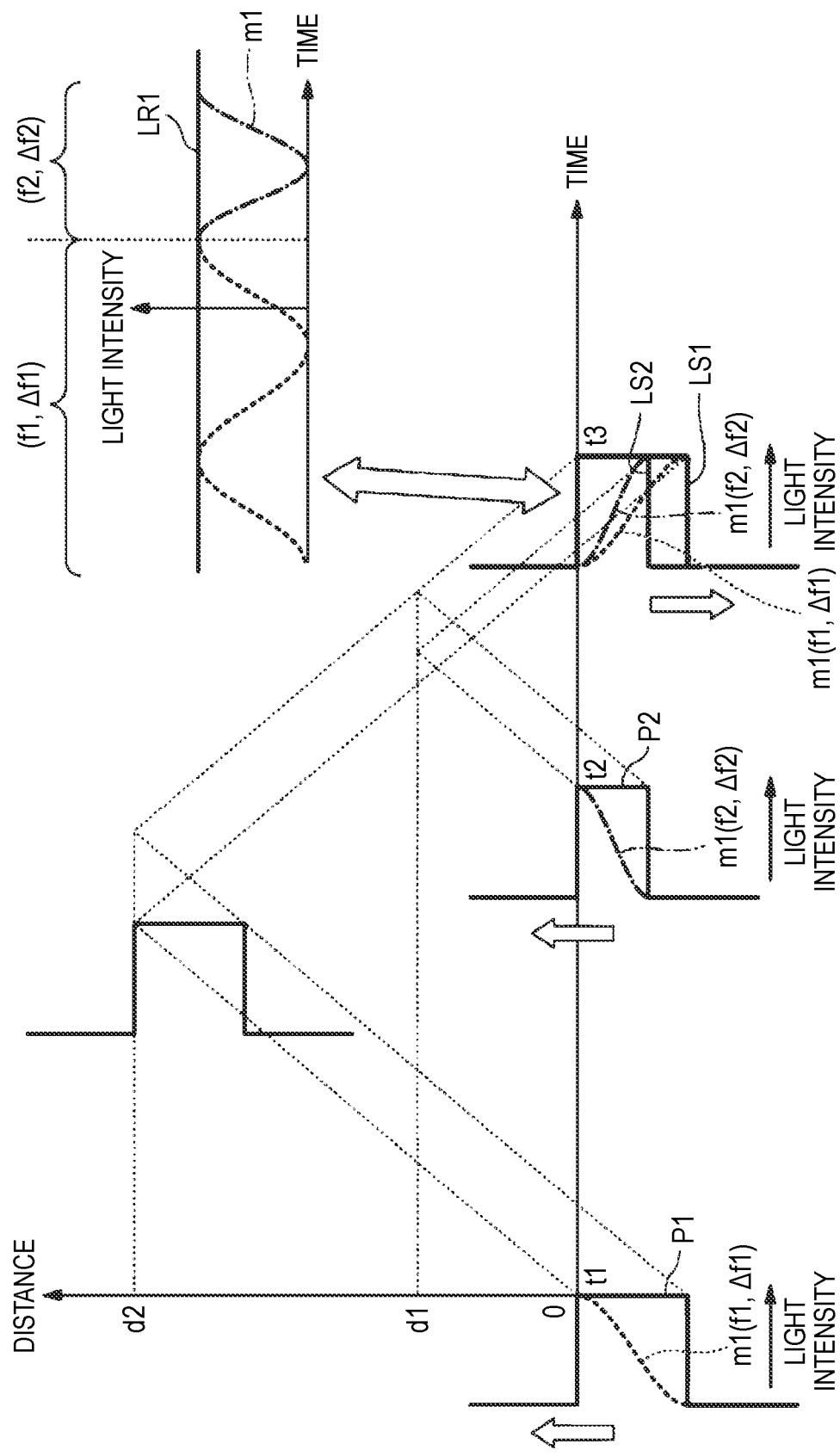
FIG. 2 is a diagram for explaining a measurement principle of an optical fiber characteristics measuring apparatus according to one or more embodiments of the present invention.

FIG. 2 is a diagram for explaining a measurement principle of an optical fiber characteristics measuring apparatus according to one or more embodiments the present invention. In FIG. 2, the horizontal axis represents time and the vertical axis represents a distance from one end of the optical fiber to be measured FUT. Here, it is assumed that a correlation peak appears at positions where the distances from one end (position where the distance is 0) of the optical fiber to be measured are d1 and d2. FIG. 2 shows modulated pulse light P1, P2 incident on the optical fiber to be measured FUT, backscattered light LS1, LS2 emitted from the one end of the optical fiber to be measured FUT, and the reference light LR1.

The modulated pulse light P1 is the first pulse light incident on the optical fiber to be measured at time t1, and the modulated pulse light P2 is the second pulse light incident on the optical fiber to be measured at time t2. The backscattered light LS1 is the Brillouin scattered light obtained by the modulated pulse light P1 arriving at the position where the distance from the one end of the optical fiber to be measured is d2, and the backscattered light LS2 is the Brillouin scattered light obtained by the modulated pulse light P2 arriving at the position where the distance from the one end of the optical fiber to be measured is d1.

For convenience of illustration, light intensity of the modulated pulse light P1, P2 and backscattered light LS1, LS2 is taken as shown in a right direction of the page. In FIG. 2, for convenience of understanding, the modulated pulse light P1, P2, the backscattered light LS1, LS2, and the reference light LR1 are shown together with a modulation signal m1 which is used for frequency modulation. The modulated pulse light P1 is frequency-modulated with modulation parameters (modulation frequency f1, modulation amplitude Δf1), the modulated pulse light P2 is frequency-modulated with modulation parameters (modulation frequency f2, modulation amplitude Δf2). The product of modulation frequency f2 and modulation amplitude Δf2 is equal to the product of modulation frequency f1 and modulation amplitude Δf1. In addition, the pulse width of the modulated pulse light P1 is set to half a period of the modulation period corresponding to the modulation frequency f1, and the pulse width of the modulated pulse light P2 is set to half a period of the modulation period corresponding to the modulation frequency f2.

As shown in FIG. 2, the backscattered light LS1 is obtained when the modulated pulse light P1 incident on the optical fiber to be measured FUT at time t1 arrives at the position where the distance from the one end of the optical fiber to be measured FUT is d2. In addition, the backscattered light LS2 is obtained when the modulated pulse light P2 incident on the optical fiber to be measured FUT at time t2 arrives at the position where the distance from the one end of the optical fiber to be measured FUT is d1. In the example shown in FIG. 2, the backscattered light LS1, LS2 is emitted from the one end of the optical fiber to be measured FUT at exactly the same timing (time t3) and then received.

Figure 9:
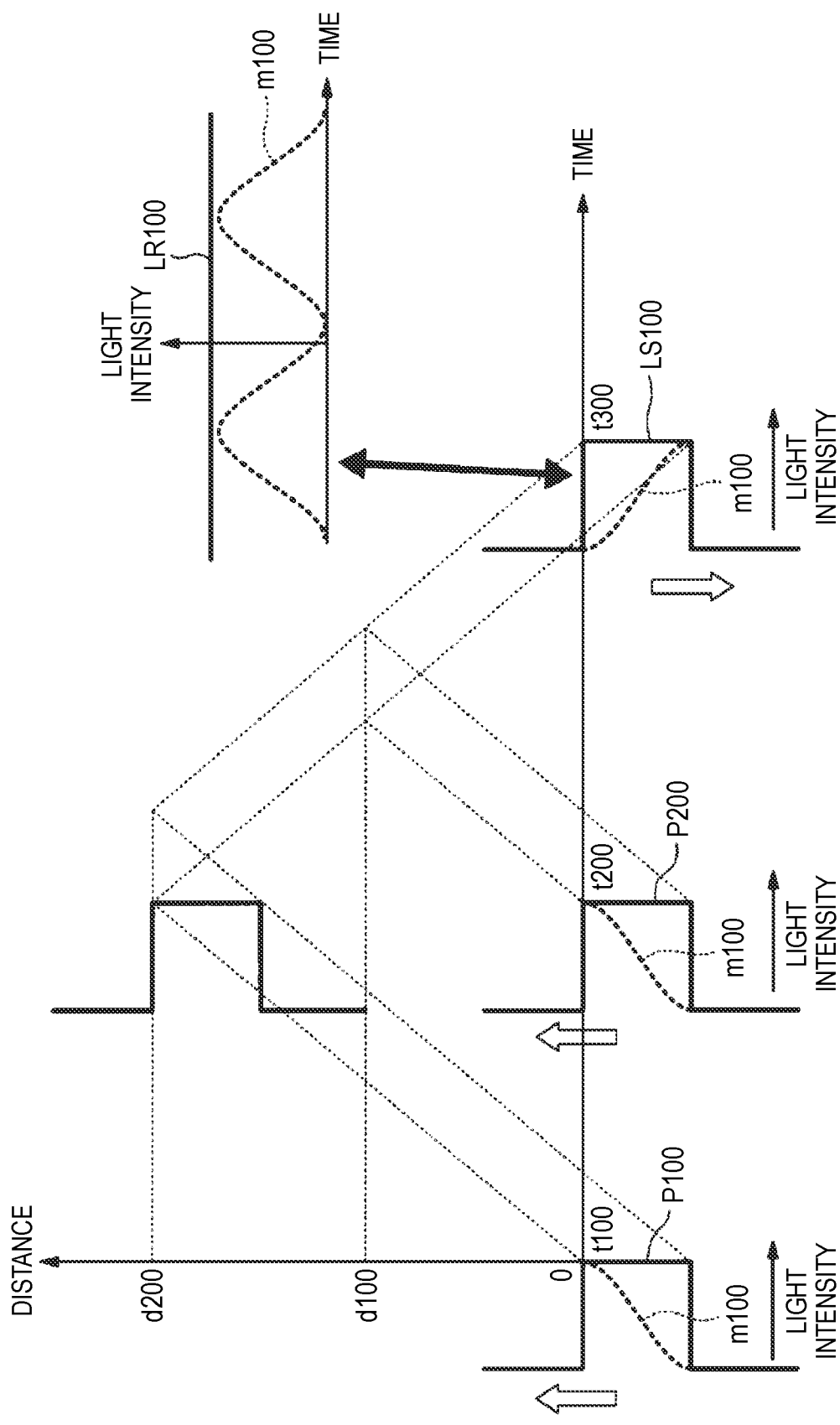
FIG. 9 is a diagram for explaining a related-art temporal gating scheme.

In the related-art temporal gating scheme, as described with reference to FIG. 9, when backscattered light (Brillouin scattered light) obtained at different positions is received at the same timing, it is not possible to be measured individually. On the contrary, in one or more embodiments, modulated pulse light P1, P2 frequency-modulated with different modulation parameters is incident on the optical fiber to be measured FUT. Therefore, the backscattered light LS1 obtained by the modulated pulse light P1 and the backscattered light LS2 obtained by the modulated pulse light P2 can be distinguished even if they are overlapped with each other as shown in FIG. 2.

In the example shown in FIG. 2, at the timing (time t3) at which the backscattered light LS1, LS2 is received in a state of overlapping with each other, the reference light LR1 frequency-modulated with the modulation parameters (modulation frequency f1, modulation amplitude Δf1) is input to the optical coupler unit 16 (see FIG. 1). Therefore, at this timing, the one having strong interference with the reference light LR1 is only the backscattered light LS1 which is obtained by the modulated pulse light P1 modulated with the modulation parameters (modulation frequency f1, modulation amplitude Δf1). Incidentally, at this timing, even if the backscattered light LS2, which is obtained by the modulated pulse light P2 modulated with the modulation parameters (modulation frequency f2, modulation amplitude Δf2), interferes with the reference light LR1, a beat component is generated due to the frequency difference between the modulation frequency f1 and the modulation frequency f2, and therefore the signal intensity is lowered on average.

According to the principle described above, even if the next modulated pulse light P2 is incident on the optical fiber to be measured FUT without waiting for the return of the backscattered light LS1 which is obtained by the modulated pulse light P1, one correlation peak can be selected from a plurality of correlation peaks appearing on the optical fiber to be measured FUT. Therefore, in one or more embodiments, the characteristics of the optical fiber to be measured FUT can be measured by making the next modulated pulse light P2 incident on the optical fiber to be measured FUT without waiting for the return of the backscattered light LS1 which is obtained by making the modulated pulse light P1 incident on the optical fiber to be measured FUT. Incidentally, when it is desired to select the backscattered light LS2, interference is made with the reference light LR1 frequency-modulated by the modulation parameters (modulation frequency f2, modulation amplitude Δf2).

<Operation of Optical Fiber Characteristics Measuring Apparatus>

Figure 3:
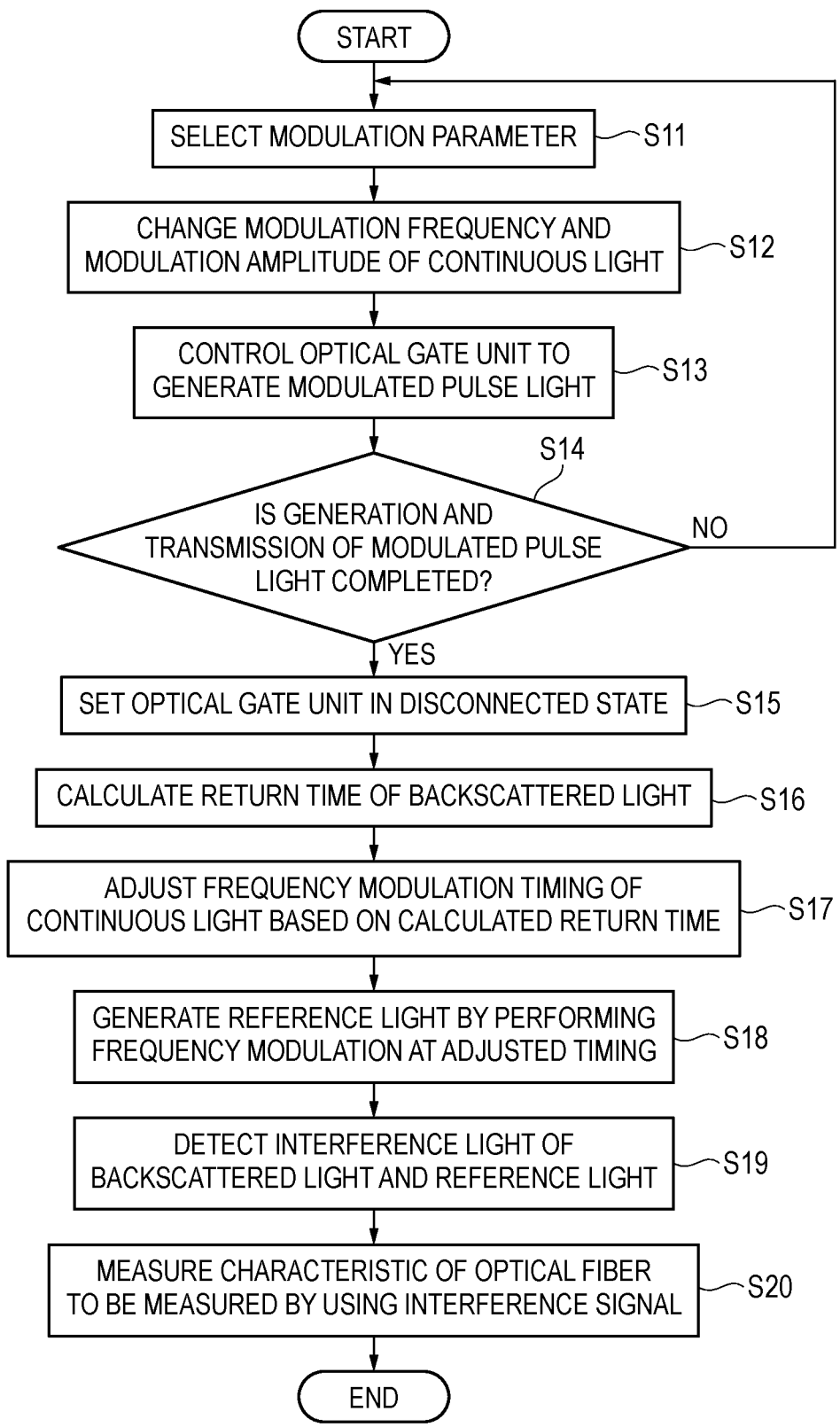
FIG. 3 is a flowchart showing an operation example of an optical fiber characteristics measuring apparatus according to one or more embodiments of the present invention.

FIG. 3 is a flowchart showing an operation example of an optical fiber characteristics measuring apparatus according to one or more embodiments of the present invention. Incidentally, the flowchart shown in FIG. 3 is started, for example, when an instruction of starting measurement is issued to the optical fiber characteristics measuring apparatus 1, and may be repeated at a constant cycle depending on measurement conditions of the optical fiber to be measured FUT.

Figure 4:
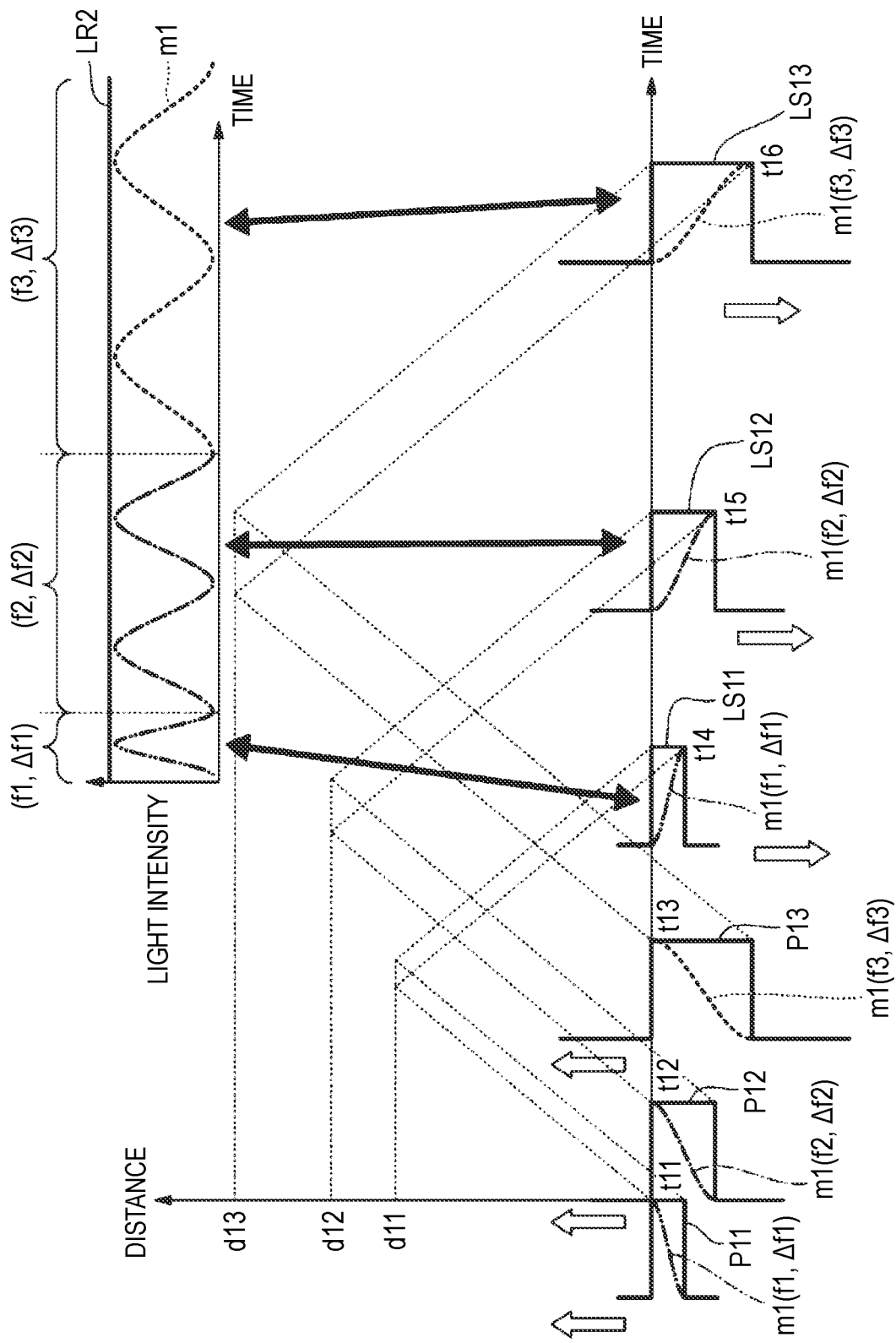
FIG. 4 is a diagram for explaining an operation example of an optical fiber characteristics measuring apparatus according to one or more embodiments of the present invention.

FIG. 4 is a diagram for explaining an operation example of an optical fiber characteristics measuring apparatus according to one or more embodiments of the present invention. FIG. 4 is a diagram similar to FIG. 2. However, the vertical axis in FIG. 4 is different from that in FIG. 2, and it is assumed that correlation peaks appear at positions where the distances are d11, d12, and d13. In FIG. 4, it is assumed that one end of the optical fiber to be measured is disposed at a position where the distance is d11. FIG. 4 shows modulated pulse light P11, P12, and P13 incident on the optical fiber to be measured FUT, backscattered light LS11, LS12, and LS13 emitted from the other end of the optical fiber to be measured FUT, and the reference light LR2. The notations of the modulated pulse light P11, P12, and P13, the backscattered light LS11, LS12, and LS13, and the modulation signal m1 are the same as those in FIG. 2.

When the processing of the flowchart in FIG. 3 is started, first, a modulation parameter is selected in the control unit 20 of the optical fiber characteristics measuring apparatus 1 (step S11). For example, in a case where a plurality of combinations of modulation parameters for keeping the spatial resolution Δz constant are prepared in advance in the control unit 20, one combination is selected therefrom. Here, it is assumed that a modulation parameter combination in which modulation frequency is f1 and modulation amplitude is Δf1 is selected.

Next, the control unit 20 changes the modulation frequency and the modulation amplitude of the continuous light L1 emitted from the light source 11 based on the selected modulation parameter (step S12). Specifically, the modulation unit 11b provided in the light source 11 is controlled by the control unit 20 to set the frequency of the modulation signal m1 output from the modulation unit 11b to modulation frequency f1, and set the amplitude of the modulation signal m1 to modulation amplitude Δf1. When such a modulation signal m1 is input to the light source 11a, the light source 11a emits the continuous light L1 that is frequency-modulated with the modulation frequency f1 and the modulation amplitude Δf1.

The continuous light L1 emitted from the light source 11a is incident on the first optical branching unit 12 and is branched into pump light LP and reference light LR. The branched pump light LP is incident on the optical gate 14 after passing through the optical delaying unit 13. Then, the optical gate 14 is controlled by the control unit 20 to generate the modulated pulse light P by shaping the pump light LP into a pulse shape (step S13). The pulse width of the generated modulated pulse light P is half a period of the modulation period corresponding to the modulation frequency f1.

The modulated pulse light P generated by the optical gate 14 is incident on the optical fiber to be measured FUT as the modulated pulse light P11 after passing through the second optical branching unit 15 and the optical connector CN in order. Then, the modulated pulse light P11 propagates in the optical fiber to be measured FUT (see FIG. 4). Incidentally, although the reference light LR branched by the first optical branching unit 12 is incident on the optical coupler unit 16, it does not contribute to the measurement of the backscattered light LS.

Next, the control unit 20 judges whether generation and transmission of the modulated pulse light P used for measurement of the optical fiber to be measured FUT is completed (step S14). In a case where it is judged that the generation and transmission of the modulated pulse light P is not completed (the case where a judgment result is "NO"), the control unit 20 selects a modulation parameter again (step S11). Here, it is assumed that a modulation parameter combination in which modulation frequency is f2 and modulation amplitude is Δf2 is selected.

When the modulation parameter is selected, as described above, the modulation frequency and modulation amplitude of the continuous light L1 emitted from the light source 11 are changed (step S12), and the pump light LP branched by the first optical branching unit 12 is shaped into a pulse shape to generate the modulated pulse light P (step S13). Accordingly, the modulated pulse light P, which is modulated with the modulation frequency f2 and has a pulse width that is half a period of the modulation period corresponding to the modulation frequency f2, is generated. The modulated pulse light P is incident on the optical fiber to be measured FUT as the modulated pulse light P12 after passing through the second optical branching unit 15 and the optical connector CN in order. Then, the modulated pulse light P12 propagates in the optical fiber to be measured FUT (see FIG. 4).

Next, the control unit 20 judges whether generation and transmission of the modulated pulse light P used for measurement of the optical fiber to be measured FUT is completed (step S14). Again, in a case where it is judged that the generation and transmission of the modulated pulse light P is not completed (the case where a judgment result is "NO"), the control unit 20 selects a modulation parameter again (step S11). Here, it is assumed that a modulation parameter combination in which modulation frequency is f3 and modulation amplitude is Δf3 is selected.

When the modulation parameter is selected, as described above, the modulation frequency and modulation amplitude of the continuous light L1 emitted from the light source 11 are changed (step S12), and the pump light LP branched by the first optical branching unit 12 is shaped into a pulse shape to generate the modulated pulse light P (step S13). Accordingly, the modulated pulse light P, which is modulated with the modulation frequency f3 and has a pulse width that is half a period of the modulation period corresponding to the modulation frequency f3, is generated. The modulated pulse light P is incident on the optical fiber to be measured FUT as the modulated pulse light P13 after passing through the second optical branching unit 15 and the optical connector CN in order. Then, the modulated pulse light P13 propagates in the optical fiber to be measured FUT (see FIG. 4).

Next, the control unit 20 judges whether generation and transmission of the modulated pulse light P used for measurement of the optical fiber to be measured FUT is completed (step S14). Here, it is assumed that generation and transmission of the modulated pulse light P is completed. Then, the judgment result of step S14 is "YES", and the optical gate 14 is controlled by the control unit 20 to bring the optical path between the first optical branching unit 12 and the second optical branching unit 15 into a disconnected state (step S15).

Thereafter, return time (for example, the time for the backscattered light LS11, LS12, and LS13 to arrive at the optical coupler unit 16) of the backscattered light LS11, LS12, and LS13 are calculated by the control unit 20 (step S16). Here, positions (positions where the distances are d11, d12, and d13 in FIG. 4) of correlation peaks appearing in the optical fiber to be measured FUT are known. Further, time (or time of incidence on the optical fiber to be measured FUT) of transmitting the modulated pulse light P11, P12, and P13 are also known. Therefore, the control unit 20 can calculate the return times (times t14, t15, and t16) of the backscattered light LS11, LS12, and LS13.

Next, based on the calculated return time, a frequency modulation timing of the continuous light L1 is adjusted by the control unit 20 (step S17). In order to detect the backscattered light LS11 obtained by the modulated pulse light P11, the reference light LR2 frequency-modulated with the modulation parameter (modulation frequency f1, modulation amplitude Δf1) needs to be input to the optical coupler unit 16 at the timing when the backscattered light LS11 is incident on the optical coupler unit 16. In addition, in order to detect the backscattered light LS12 obtained by the modulated pulse light P12, the reference light LR2 frequency-modulated with the modulation parameter (modulation frequency f2, modulation amplitude Δf2) needs to be input to the optical coupler unit 16 at the timing when the backscattered light LS12 is incident on the optical coupler unit 16.

Similarly, in order to detect the backscattered light LS13 obtained by the modulated pulse light P13, the reference light LR2 frequency-modulated with the modulation parameter (modulation frequency f3, modulation amplitude Δf3) needs to be input to the optical coupler unit 16 at the timing when the backscattered light LS13 is incident on the optical coupler unit 16. For this reason, the frequency modulation timing of the continuous light L1 is adjusted such that the reference light LR2 modulated with each of the modulation parameters is incident on the optical coupler unit 16 at the same timing when the backscattered light LS11, LS12, and LS13 is incident on the optical coupler unit 16.

When the above timing adjustment is completed, the continuous light L1 is frequency-modulated at the adjusted timing to generate the reference light LR2 under the control of the control unit 20 (step S18). Specifically, the modulation unit 11b provided in the light source 11 is controlled by the control unit 20 to set the frequency of the modulation signal m1 output from the modulation unit 11b to modulation frequency f1, f2, and f3 sequentially, and set the amplitude of the modulation signal m1 to modulation amplitude Δf1, Δf2, and Δf3 sequentially at the timings adjusted at step S17. When such a setting is made, the continuous light L1 frequency-modulated with the modulation frequency f1, f2, and f3 sequentially is emitted from the light source 11a.

The continuous light L1 emitted from the light source 11a is incident on the first optical branching unit 12 and is branched into pump light LP and reference light LR. The branched reference light LR is input to the optical coupler unit 16 and mixed with the backscattered light LS output from the second optical branching unit 15, and interference light thereof is detected by the detection unit 17 (step S19). Here, as shown in FIG. 4, the reference light LR2 frequency-modulated with the modulation parameter (modulation frequency f1, modulation amplitude Δf1) is incident on the optical coupler unit 16 at the timing (time point t14) when the backscattered light LS11 is incident on the optical coupler unit 16. For this reason, strong interference occurs between the backscattered light LS11 and the reference light LR2.

Further, the reference light LR2 frequency-modulated with the modulation parameter (modulation frequency f2, modulation amplitude Δf2) is incident on the optical coupler unit 16 at the timing (time point t15) when the backscattered light LS12 is incident on the optical coupler unit 16. For this reason, strong interference occurs between the backscattered light LS12 and the reference light LR2. Further, the reference light LR2 frequency-modulated with the modulation parameter (modulation frequency f3, modulation amplitude Δf3) is incident on the optical coupler unit 16 at the timing (time point t16) when the backscattered light LS13 is incident on the optical coupler unit 16. For this reason, strong interference occurs between the backscattered light LS13 and the reference light LR2.

When the interference light of the backscattered light LS and the reference light LR is detected by the detection unit 17, the characteristic of the optical fiber to be measured FUT is measured using a detection signal (a beat signal indicating a frequency difference between the backscattered light LS and the reference light LR) output from the detection unit 17 (step S20). Specifically, the detection signal output from the detection unit 17 is acquired by the acquisition unit 18, and frequency characteristics thereof are measured. The calculation unit 19 calculates a Brillouin frequency shift from the spectrum data measured by the acquisition unit 18. Incidentally, the Brillouin frequency shift obtained by the calculation is displayed on a display unit (not shown) provided in the calculation unit 19, for example. When the above processing is completed, a signal indicating that the processing is completed is output from the calculation unit 19 to the control unit 20. As described above, a series of processing shown in FIG. 3 is completed.

Numerical Example

Figures 5, 6:
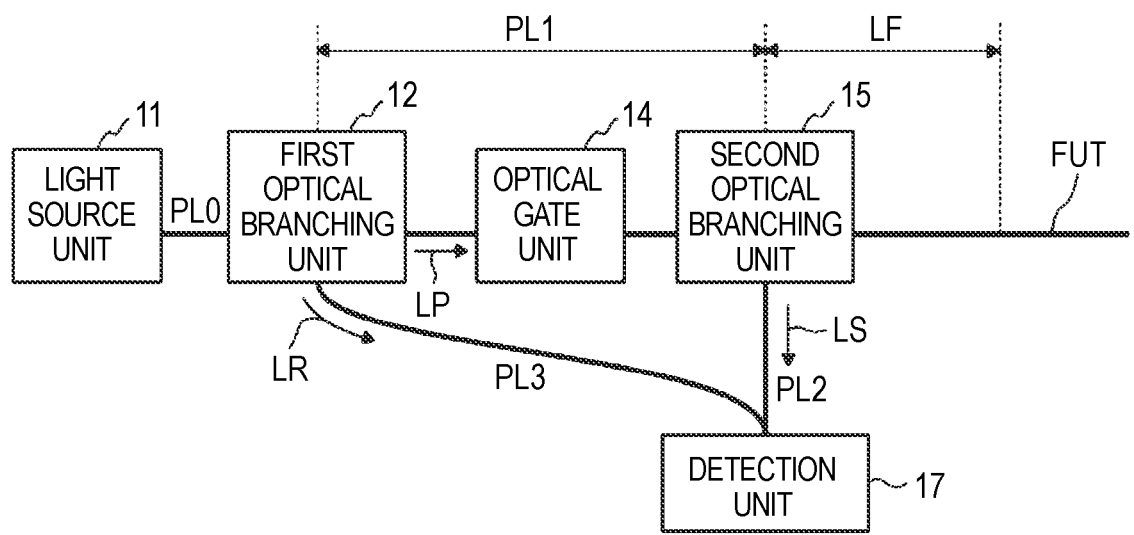
FIG. 5 is a diagram showing an optical path length of an optical fiber characteristics measuring apparatus according to one or more embodiments of the present invention.
FIG. 6 is a diagram showing a relationship between a distance to a measuring point of an optical fiber to be measured and a difference in time required for reference light and backscattered light to arrive at a detection unit in one or more embodiments of the present invention.

Next, a more specific explanation will be described by giving a numerical example. FIG. 5 is a diagram showing an optical path length of an optical fiber characteristics measuring apparatus according to one or more embodiments of the present invention. In FIG. 5, only the light source 11, the first optical branching unit 12, the optical gate 14, the second optical branching unit 15, the detection unit 17 and the optical fiber to be measured FUT are shown, and other components shown in FIG. 1 are omitted.

As shown in FIG. 5, an optical path length between the light source 11 and the first optical branching unit 12 is PL0, an optical path length between the first optical branching unit 12 and the second optical branching unit 15 is PL1, an optical path length between the second optical branching unit 15 and the detection unit 17 is PL2, and an optical path length between the first optical branching unit 12 and the detection unit 17 is PL3. Further, a one-way optical path length from the second optical branching unit 15 to a measuring point is LF. Here, in order to simplify the explanation, it is assumed that one end of the optical fiber to be measured FUT is disposed at a position where the optical path length LF is 0. That is, the optical path length LF is assumed to be a one-way optical path length from the one end of the optical fiber to be measured FUT to the measuring point.

When D is an optical path length difference between an optical path of the pump light LP (including an optical path of the backscattered light LS obtained by the pump light LP) and an optical path of the reference light LR in a case where the optical path length LF is 0, it is expressed by the formula: D=(PL1+PL2)−PL3. In a case where the optical path length of the reference light LR is longer than the optical path length of the pump light LP, the sign of the optical path length difference D is inverted such that D=−D. The optical path length difference between the optical path of the reference light LR and the optical path of the pump light LP including the case where the optical path length LF is other than 0 and the optical path length difference D+2×LF is larger than 0 (D+2×LF>0) is expressed by the formula: D+2×LF. Further, in a case where the optical path length LF is other than 0 and the optical path length difference D+2×LF is smaller than 0 (D+2×LF<0), the optical path length difference between the optical path of the reference light LR and the optical path of the pump light LP is expressed by the formula: −D−2×LF.

Here, the optical path length difference D is 500 [m], and light velocity V in the optical fiber is $2\times10^8$ [m/s]. FIG. 6 shows the time tLF required for the backscattered light LS at the measuring point of the optical fiber to be measured FUT to arrive at the detection unit 17 after the reference light LR arrives at the detection unit 17. It can be said that the time tLF described above is a difference (the difference in time required for the reference light and the backscattered light to arrive at the detection unit) between the time required for the reference light LR branched by the first optical branching unit 12 to arrive at the detection unit 17 and the time required for the backscattered light LS to arrive at the detection unit 17, the backscattered light LS being obtained by the modulated pulse light P based on the pump light LP which is branched by the first optical branching unit 12 at the same time as the reference light LR. FIG. 6 is a diagram showing a relationship between a distance to the measuring point of the optical fiber to be measured and the difference in time required for the reference light and the backscattered light to arrive at the detection unit in one or more embodiments of the present invention.

For example, in a case where the distance from the one end of the optical fiber to be measured FUT to the measuring point is 0 [m] (in a case where the optical path length LF is 0 [m]), the time tLF required for the backscattered light LS generated at the measuring point (near the one end of the optical fiber to be measured FUT) to arrive at the detection unit 17 after the reference light LR arrives at the detection unit 17 is 2.5 [μs]. Further, in a case where the optical path length LF is 500 [m], the time tLF is 7.5 [μs], and in a case where the optical path length LF is 1000 [m], the time tLF is 12.5 [μs].

In the case where the optical path length LF is 0 [m], the backscattered light LS at the measuring point of the optical fiber to be measured FUT arrives at the detection unit 17 earliest after the reference light LR arrives at the detection unit 17, and the time is 2.5 [μs]. Assuming that the modulation frequency fm of the modulation signal m1 output from the modulation unit 11b of the light source 11 is about 10 [MHz] (modulation period about 100 [ns]), during the 2.5 [μs], since the modulation frequency can be changed approximately 50 times in units of half a period of the modulation period, the modulated pulse light P can be transmitted approximately 50 times.

Here, it is assumed that the positions where the distances are d11, d12, and d13 in FIG. 4 are the measuring points where the optical path length LF is 0 [m], 500 [m] and 1000 [m], respectively. Then, the backscattered light LS11 which is obtained by the modulated pulse light P11 arrives at the detection unit 17 after 2.5 [μs] since the reference light LR2 frequency-modulated with the modulation parameter (modulation frequency f1, modulation amplitude Δf1) arrives at the detection unit 17. Further, the backscattered light LS12 which is obtained by the modulated pulse light P12 arrives at the detection unit 17 after 7.5 [μs]since the reference light LR2 frequency-modulated with the modulation parameter (modulation frequency f2, modulation amplitude Δf2) arrives at the detection unit 17. Further, the backscattered light LS13 which is obtained by the modulated pulse light P13 arrives at the detection unit 17 after 12.5 [μs] since the reference light LR2 frequency-modulated with the modulation parameter (modulation frequency f3, modulation amplitude Δf3) arrives at the detection unit 17. Incidentally, before the backscattered light (backscattered light LS11) arrives at the detection unit 17, the transmission of the modulated pulse light P11, P12, and P13 is completed.

The modulation frequency f1, f2, and f3 are 10.27 [MHz], 10.20 [MHz] and 10.10 [MHz], respectively. At each modulation frequency, an interval of correlation peaks along the longitudinal direction of the optical fiber to be measured FUT is approximately 10 [m]. Therefore, a plurality of correlation peaks appears in the optical fiber to be measured FUT. In a case where the optical path length difference D is 500 [m], the correlation peaks appearing at measuring points where the optical path length LF is 0 [m], 500 [m] and 1000 [m] are correlation peaks of 50 th, 149 th and 246 th orders, respectively. In the processing of step S16 in FIG. 3, the return time of the backscattered light LS1, LS12, and LS13 is obtained based on the optical path length difference D, the optical path length LF, and the timing at which the frequency modulation is performed.

In the previously-described embodiments, in a case where a plurality of modulated pulse light P is transmitted, basically, it is desirable to transmit a modulated pulse light P modulated with a relatively high modulation frequency first, and transmit a modulated pulse light P modulated with a relatively low modulation frequency later. By doing as described above, the backscattered light by the modulated pulse light P modulated with the relatively high modulation frequency can be obtained at one side of the optical fiber to be measured FUT, and the backscattered light by the modulated pulse light P modulated with the relatively low modulation frequency can be obtained at the other side of the optical fiber to be measured FUT. Therefore, the backscattered light by the modulated pulse light P modulated with the relatively high modulation frequency and the backscattered light by the modulated pulse light P modulated with the relatively low modulation frequency can be separated on the time axis, and thus the processing (processing of steps S16 to S18 in FIG. 3) of generating the reference light LR becomes easy.

As described above, in one or more embodiments, the modulation frequency of the continuous light L1 output from the light source 11 is changed in units of half a period of the modulation period corresponding to the modulation frequency. Then, the optical path between the first optical branching unit 12 and the second optical branching unit 15 is brought into the disconnected state by the optical gate 14, and the reference light LR that interferes with the backscattered light LS is obtained by changing the modulation frequency of the continuous light L1 output from the light source 11 in units of one period of the modulation period corresponding to the modulation frequency in consideration of the return time of the backscattered light LS. Therefore, the characteristics of the optical fiber to be measured FUT can be measured by making the next modulated pulse light P incident on the optical fiber to be measured FUT without waiting for the return of the backscattered light LS which is obtained by making the modulated pulse light P incident on the optical fiber to be measured FUT. Thus, in one or more embodiments, the time required for measurement of the optical fiber to be measured FUT can be reduced. Incidentally, the longer the length of the optical fiber to be measured FUT, the greater the effect of reducing the time required for measurement of the optical fiber to be measured FUT.

For example, as described with reference to FIGS. 5 and 6, in a case where the optical path length difference D is 500 [m], during the 2.5 [μs] until the backscattered light LS at the measuring point of the optical fiber to be measured FUT arrives at the detection unit 17 earliest after the reference light LR arrives at the detection unit 17, it is possible to change the modulation frequency approximately 50 times, so that the modulated pulse light P can be transmitted approximately 50 times. Here, in the related-art temporal gating scheme, the next modulated pulse light must be incident on the optical fiber to be measured FUT after the backscattered light on the other end of the optical fiber to be measured FUT returns back to the one end of the optical fiber to be measured FUT. On the contrary, in one or more embodiments, a plurality of modulated pulse light (in the example described above, approximately 50 beams of modulated pulse light) can be incident on the optical fiber to be measured FUT before the backscattered light on the other end of the optical fiber to be measured FUT returns back to the one end of the optical fiber to be measured FUT, so that the time required for measurement of the optical fiber to be measured FUT can be greatly reduced as compared with that in the related-art temporal gating scheme.

The number of the modulated pulse light P which can be continuously incident on the optical fiber to be measured FUT at a time increases as the optical path length difference D increases. For example, in a case where the optical path length difference D is 500 [m], the modulated pulse light P can be continuously transmitted approximately 50 times as described above, and in a case where the optical path length difference D is 1000 [m], the modulated pulse light P can be continuously transmitted approximately 100 times. Therefore, it is effective to provide the optical delaying unit 13 so as to increase the number of modulated pulse light P to be continuously incident on the optical fiber to be measured FUT.

<First Modification>

In the previously-described embodiments, an example is described in which the modulation parameter (modulation frequency fm, modulation amplitude Δfm) is changed so that the spatial resolution Δz in the longitudinal direction of the optical fiber to be measured FUT is constant for each unit for the frequency modulation. For example, as described with reference to FIG. 2, an example is described in which the product of modulation frequency f2 and modulation amplitude Δf2 is equal to the product of modulation frequency f1 and modulation amplitude Δf1. However, the modulation parameter (modulation frequency fm, modulation amplitude Δfm) may also be changed so that the spatial resolution Δz in the longitudinal direction of the optical fiber to be measured FUT differs from one unit to another unit for frequency modulation. For example, the change may be performed so that the product of modulation frequency f2 and modulation amplitude Δf2 is different from the product of modulation frequency f1 and modulation amplitude Δf1 in FIG. 2. In order to make the products different from each other, for example, the modulation frequency may be changed while keeping the modulation amplitude constant.

<Second Modification>

In the previously-described embodiments, as described in FIG. 4, measuring points arranged in the longitudinal direction of the optical fiber to be measured FUT are sequentially measured from one end to the other end. Such a measuring method is a so-called sequential measuring method. On the contrast, in this modification, the measurement points arranged in the longitudinal direction of the optical fiber to be measured FUT are randomly changed. Such a measuring method is a so-called random access measuring method.

Figure 7:
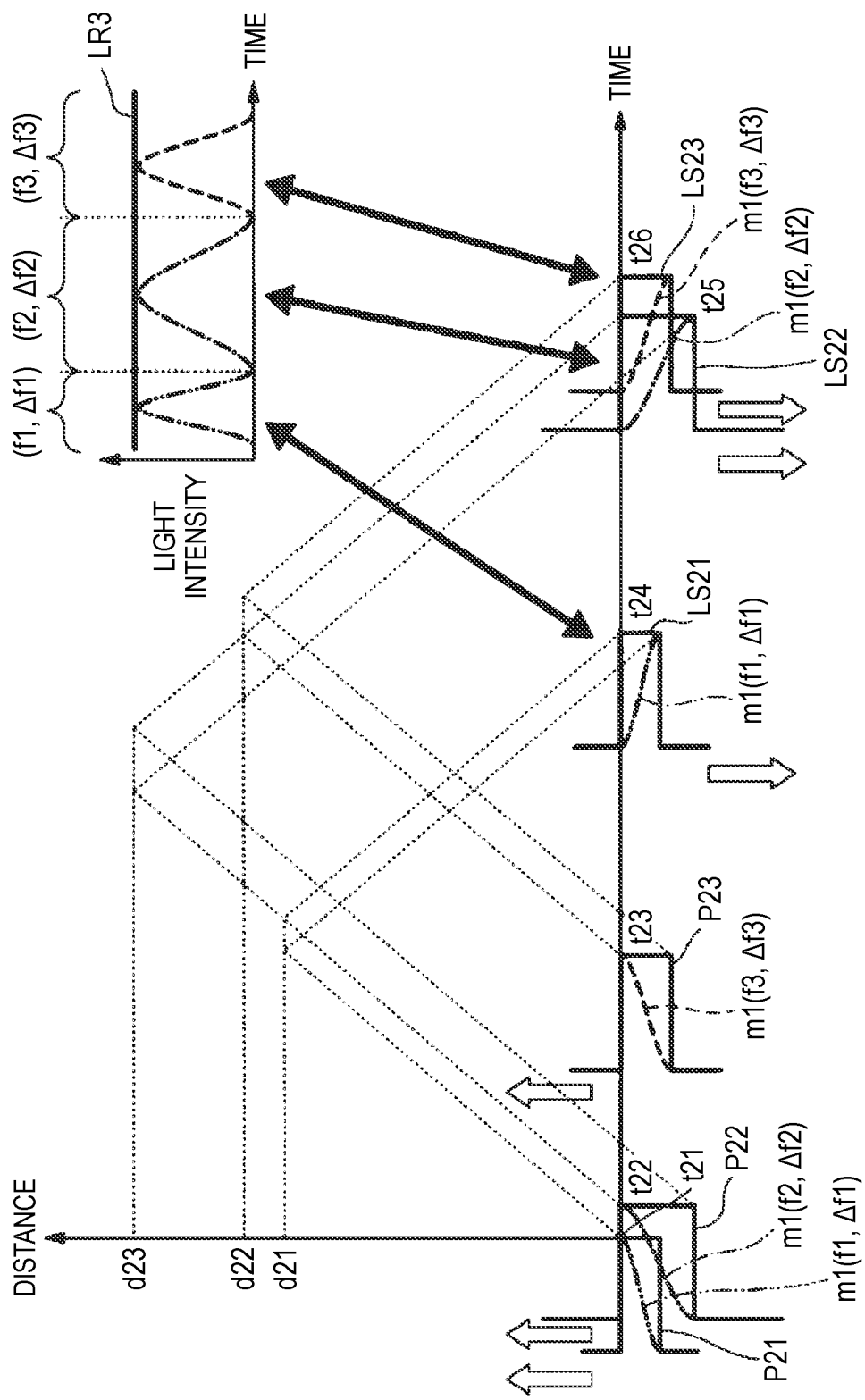
FIG. 7 is a diagram for explaining another operation example of an optical fiber characteristics measuring apparatus according to one or more embodiments of the present invention.

FIG. 7 is a diagram for explaining another operation example of an optical fiber characteristics measuring apparatus according to one or more embodiments of the present invention. FIG. 7 is a diagram similar to FIG. 4. In FIG. 7, it is assumed that correlation peaks appear at positions where the distances are d21, d22, and d23. A relation of the distances is d21<d22<d23. FIG. 7 shows modulated pulse light P21, P22, and P23 incident on the optical fiber to be measured FUT, backscattered light LS21, LS22, and LS23 emitted from the one end of the optical fiber to be measured FUT, and the reference light LR3. The notations of the modulated pulse light P21, P22, and P23, the backscattered light LS21, LS22, and LS23, and the modulation signal m1 are the same as those in FIG. 4.

As shown in FIG. 7, modulated pulse light P21 frequency-modulated with the modulation parameter (modulation frequency f1, modulation amplitude Δf1), modulated pulse light P22 frequency-modulated with the modulation parameter (modulation frequency f2, modulation amplitude Δf2) and modulated pulse light P23 frequency-modulated with the modulation parameter (modulation frequency f3, modulation amplitude Δf3) are sequentially transmitted at times t21, t22, and t23. In the example shown in FIG. 7, backscattered light LS21, LS22, and LS23 is separately obtained when the modulated pulse light P21, P22, and P23 arrives at positions where the distances are d21, d22, and d23.

Here, as shown in FIG. 7, when transmitting the modulated pulse light P21, P22, and P23, time positions of the modulated pulse light P21 and P22 are close to each other, but the time position of the modulated pulse light P23 is far away from the time positions of the modulated pulse light P21 and P22. On the other hand, when the backscattered light LS21, LS22, and LS23 obtained by the modulated pulse light P21, P22, and P23, time positions of the backscattered light LS22 and backscattered light LS23 are close to each other, but the time position of the backscattered light LS21 is far away from the time positions of the backscattered light LS22 and LS23.

However, an arrangement order of the modulated pulse light P21, P22, and P23 on the time axis and an arrangement order of the backscattered light LS21, LS22, and LS23 on the time axis are not changed. In addition, the arrangement of the modulation parameter used for the frequency modulation of the modulated pulse light P21, P22, and P23 on the time axis is the same as the arrangement of the modulation parameter used for the frequency modulation of the reference light LR3 on the time axis. Accordingly, transmission timing of the modulated pulse light P21 and P22 is adjusted such that the backscattered light LS21, LS22, and LS23 does not overlap with each other, and the timing of frequency modulating the continuous light L1 is appropriately adjusted when the reference light LR3 is generated, so that the random access measuring method can be performed at high speed.

In the example shown in FIG. 7, the arrangement (a change order of the modulation frequency) of the modulation parameter used for the frequency modulation of the modulated pulse light P21, P22, and P23 on the time axis and the arrangement (a change order of the modulation frequency) of the modulation parameter used for the frequency modulation of the reference light LR3 on the time axis are made the same. However, the arrangement of the modulation parameter on the time axis is not necessarily the same, and the arrangement of the modulation parameter used for the frequency modulation of the reference light LR3 on the time axis may be switched according to the timing at which the backscattered light LS21, LS22, and LS23 returns.

<Third Modification>

In the previously-described embodiments, an example is described in which a plurality of measuring points arranged in the longitudinal direction of the optical fiber to be measured FUT is measured while the spatial resolution Δz is constant. On the contrast, in this modification, one specific measuring point of the optical fiber to be measured FUT is measured while changing the spatial resolution Δz.

Figure 8:
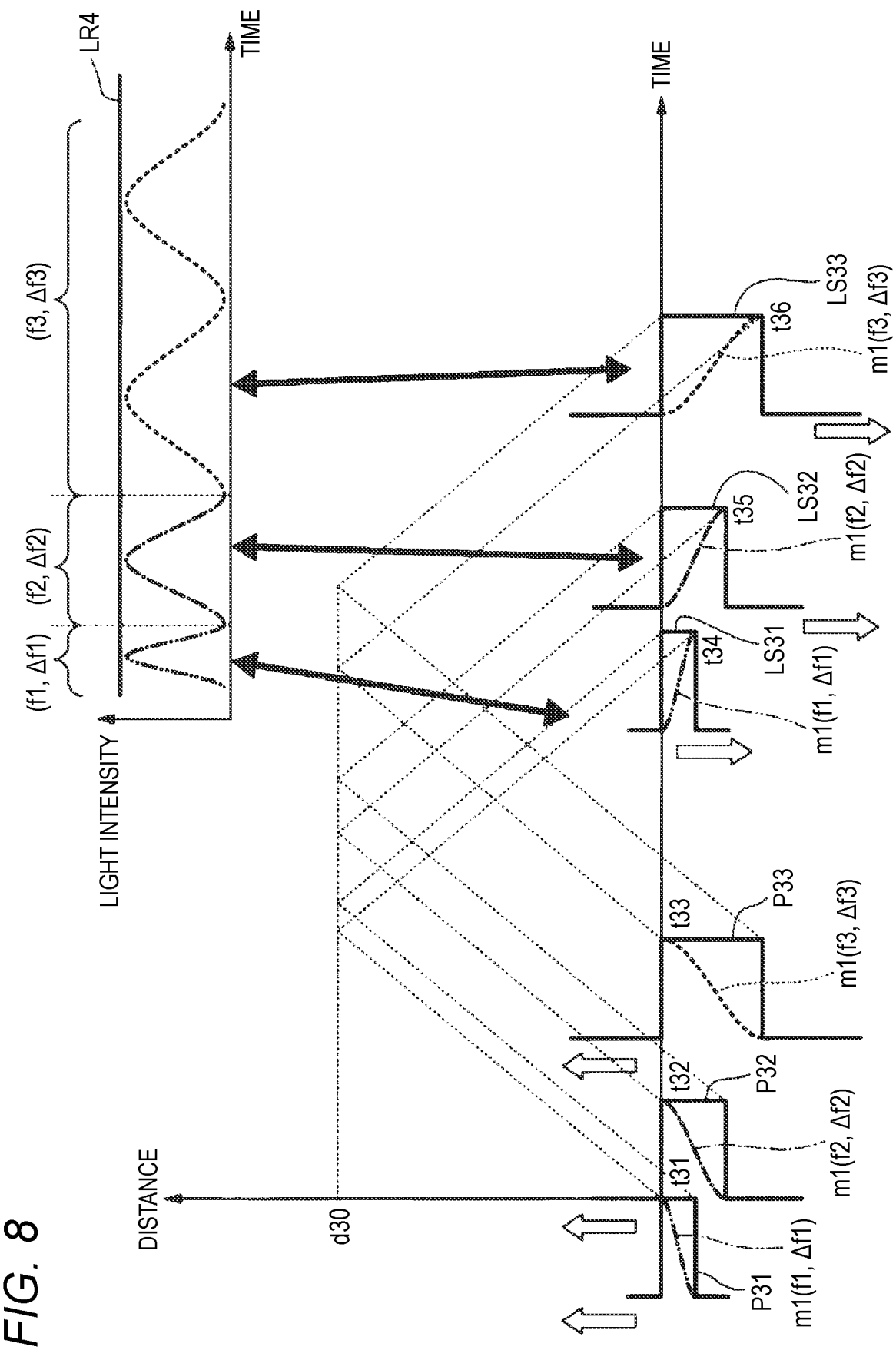
FIG. 8 is a diagram for explaining another operation example of an optical fiber characteristics measuring apparatus according to one or more embodiments of the present invention.

FIG. 8 is a diagram for explaining another operation example of an optical fiber characteristics measuring apparatus according to one or more embodiments of the present invention. FIG. 8 is a diagram similar to FIG. 7. In FIG. 8, it is assumed that a correlation peak appears at a position where the distance is d30. FIG. 8 shows modulated pulse light P31, P32, and P33 incident on the optical fiber to be measured FUT, backscattered light LS31, LS32, and LS33 emitted from the one end of the optical fiber to be measured FUT, and the reference light LR4. The notations of the modulated pulse light P31, P32, and P33, the backscattered light LS31, LS32, and LS33, and the modulation signal m1 are the same as those in FIG. 7.

As shown in FIG. 8, modulated pulse light P31 frequency-modulated with the modulation parameter (modulation frequency f1, modulation amplitude Δf1), modulated pulse light P32 frequency-modulated with the modulation parameter (modulation frequency f2, modulation amplitude Δf2) and modulated pulse light P33 frequency-modulated with the modulation parameter (modulation frequency f3, modulation amplitude Δf3) are sequentially transmitted at times t31, t32, and t33. The product of modulation frequency f1 and modulation amplitude Δf1, the product of modulation frequency f2 and modulation amplitude Δf2, and the product of modulation frequency f3 and modulation amplitude Δf3 are different from each other. In the example shown in FIG. 8, backscattered light LS31, LS32, and LS33 is separately obtained when the modulated pulse light P31, P32, and P33 arrives at the position where the distance is d30.

Here, if the control unit 20 controls the light source 11 to make the change order and change timing of the modulation frequency in a case of obtaining the reference light LR4 the same as the change order and change timing of the modulation frequency in a case of obtaining the modulated pulse light P31, P32, and P33, the reference light LR4 which strongly interferes with each of the backscattered light LS31, LS32, LS33 is generated. By interfering such reference light LR4 with the backscattered light LS31, LS32, LS33, it is possible to measure a specific measuring point of the optical fiber to be measured FUT while changing the spatial resolution Δz.

As described above, in this modification, the same measuring point can be measured with different spatial resolution Δz, and a spatial resolution variable measurement can be realized in which strain and temperature in the vicinity of the measuring point are measured while scaling. Since such measurement can be realized, it can be used for an application in which an object is measured in a coarse spatial resolution at first, and the spatial resolution is quickly changed when a sign of any abnormality is found, so that a place with occurrence of abnormality is promptly specified, for example.

In this modification, a variable delay unit which can change a delay amount is provided between the first optical branching unit 12 and the optical coupler unit 16, and a delay amount of the reference light LR can be adjusted in consideration of the return time of the backscattered light LS31, LS32, and LS33. In such a configuration, the processing (processing of steps S17 and S18 in FIG. 3) of generating the reference light LR4 by the control of the control unit 20 can be omitted.

Although the optical fiber characteristics measuring apparatus and optical fiber characteristics measuring method according to one or more embodiments of the present invention has been described above, the present invention is not limited to the previously-described embodiments, and can be freely changed within the scope of the present invention. For example, in the previously-described embodiments, an example is described in which the modulated pulse light P is generated by shaping the pump light LP branched by the first optical branching unit 12 into a pulse shape. However, the pump light LP is not necessarily shaped into a pulse shape. For example, the pump light LP whose modulation frequency is changed in units of one period or half a period of the modulation period corresponding to the modulation frequency may be directly incident on the optical fiber to be measured FUT.

Further, in the previously-described embodiments, an example is described in which the modulated pulse light P whose modulation frequency is changed in units of half a period of the modulation period and half a period of the modulation period is the pulse width is generated; and the reference light LR whose modulation frequency is changed in units of one period of the modulation period is generated. However, the modulated pulse light P may be one whose modulation frequency is changed in units of one period of the modulation period and one period of the modulation period is the pulse width; and the reference light LR may be one whose modulation frequency is changed in units of half a period of the modulation period.

For example, the modulated pulse light P whose modulation frequency is changed in units of half a period of the modulation period and half a period of the modulation period is the pulse width may be generated; and the reference light LR whose modulation frequency is changed in units of half a period of the modulation period may be generated. Further, the modulated pulse light P whose modulation frequency is changed in units of one period of the modulation period and one period of the modulation period is the pulse width may be generated; and the reference light LR whose modulation frequency is changed in units of one period of the modulation period may be generated. Alternatively, the modulated pulse light P whose modulation frequency is changed in units of one period of the modulation period and one period of the modulation period is the pulse width may be generated; and the reference light LR whose modulation frequency is changed in units of half a period of the modulation period may be generated.

The optical delaying unit 13 may be provided between the second optical branching unit 15 and the optical coupler unit 16, or between the first optical branching unit 12 and the optical coupler unit 16, other than between the first optical branching unit 12 and the second optical branching unit 15. A first optical amplifying unit which amplifies the pump light LP may be provided between the first optical branching unit 12 and the second optical branching unit 15. A second optical amplifying unit which amplifies the backscattered light LS may be provided between the second optical branching unit 15 and the optical coupler unit 16. A third optical amplifying unit which amplifies the reference light LR may be provided between the first optical branching unit 12 and the optical coupler unit 16.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber characteristics measuring apparatus comprising:
   a light source that outputs frequency-modulated continuous wave of light;
   an optical splitter that branches the continuous light into pump light and reference light;
   an optical circulator that is connected to the optical splitter and an optical fiber to be measured and that outputs backscattered light generated by making the pump light incident from one end of the optical fiber, wherein the backscattered light is Brillouin scattering in the optical fiber;
   a detector that detects interference light of the backscattered light and the reference light;
   a calculator that calculates characteristics of the optical fiber by using a detection signal output from the detector; and
   a controller that controls the light source to change, before the detector detects the interference light of the backscattered light and the reference light, modulation frequency of frequency modulation of the continuous light in terms of discrete steps of one period or half a period of a modulation period corresponding to the modulation frequency.

2. The optical fiber characteristics measuring apparatus according to claim 1,
   wherein the controller controls the light source to change modulation amplitude of the continuous light together with the modulation frequency.

3. The optical fiber characteristics measuring apparatus according to claim 2,
   wherein the controller changes the modulation frequency and the modulation amplitude such that spatial resolution in a longitudinal direction of the optical fiber is constant regardless of change of the modulation frequency and the modulation amplitude.

4. The optical fiber characteristics measuring apparatus according to claim 3,
   wherein the controller changes the modulation frequency and the modulation amplitude such that a product of the modulation amplitude and the modulation frequency before change is equal to a product of the modulation amplitude and the modulation frequency after the change.

5. The optical fiber characteristics measuring apparatus according to claim 2,
   wherein the controller changes the modulation frequency and the modulation amplitude such that spatial resolution in a longitudinal direction of the optical fiber is different from each other for each of the optical circulator and the optical splitter.

6. The optical fiber characteristics measuring apparatus according to claim 2,
   wherein the controller changes the modulation frequency and the modulation amplitude such that the modulation frequency and a combination of the modulation frequency and the modulation amplitude are different from each other for each of the optical circulator and the optical splitter.

7. The optical fiber characteristics measuring apparatus according to claim 1, further comprising:
an optical gate that brings an optical path between the optical circulator and the optical splitter into a disconnected state or a connected state under control of the controller.

8. The optical fiber characteristics measuring apparatus according to claim 7,
wherein the controller controls the optical gate to shape the pump light into pulsed light having a pulse width of one period or half a period of the modulation period.

9. The optical fiber characteristics measuring apparatus according to claim 8,
wherein, when the optical path between the optical circulator and the optical splitter is in the disconnected state, the controller controls, based on a return time of the backscattered light, the light source to generate the reference light that interferes with the backscattered light by changing the modulation frequency of the continuous light in units of one period or half a period of the modulation period corresponding to the modulation frequency.

10. The optical fiber characteristics measuring apparatus according to claim 9,
wherein, when the optical splitter makes first pump light and second pump light incident on the optical fiber, the detector detects the interference light of (i) the backscattered light obtained by the pulsed light modulated by the controller, corresponding to the first pump light and (ii) the reference light generated by the light source based on the return time of the backscattered light, corresponding to the first pump light, and
the calculator calculates the characteristics of the optical fiber by making the second pump light incident on the optical fiber without waiting for return of the backscattered light corresponding to the first pump light.

11. The optical fiber characteristics measuring apparatus according to claim 9,
wherein the controller controls a change order of the modulation frequency in a case of shaping the pump light into the pulsed light to be different from a change order of the modulation frequency in a case of obtaining the reference light.

12. The optical fiber characteristics measuring apparatus according to claim 9,
wherein the controller controls a change order and change timing of the modulation frequency in a case of shaping the pump light into the pulsed light to be respectively the same as a change order and a change timing of the modulation frequency in a case of obtaining the reference light.

13. An optical fiber characteristics measuring method, comprising:
changing modulation frequency of frequency modulation of frequency-modulated continuous wave of light output from a light source, before detecting interference light of backscattered light and reference light, in terms of discrete steps of one period or half a period of a modulation period corresponding to the modulation frequency;
detecting interference light of backscattered light and reference light, wherein the backscattered light is generated by making modulation frequency-changed light incident on one end of an optical fiber to be measured, the backscattered light is Brillouin scattering in the optical fiber, and frequency of the reference light is modulated in units of one period or half a period of the modulation period; and
measuring characteristics of the optical fiber by using a detection result of the interference light.

14. The optical fiber characteristics measuring method according to claim 13, further comprising:
obtaining the reference light by changing modulation frequency of the continuous light in units of one period or half a period of the modulation period corresponding to the modulation frequency based on a return time of the backscattered light.

15. The optical fiber characteristics measuring method according to claim 13, further comprising:
shaping the modulation frequency-changed continuous light into pulsed light having a pulse width of one period or half a period of the modulation period and being incident from the one end of the optical fiber.

* * * * *